US012077986B2

(12) United States Patent
Ramakrishna et al.

(10) Patent No.: US 12,077,986 B2
(45) **Date of Patent: *Sep. 3, 2024**

(54) COMBINATION LOCK

(71) Applicant: Schlage Lock Company LLC, Carmel, IN (US)

(72) Inventors: Manjunatha Ramakrishna, Bangalore (IN); Robert Townsend, Jamaica Plain, MA (US); Kavya M, Bangalore (IN)

(73) Assignee: Schlage Lock Company LLC, Carmel, IN (US)

( * ) Notice: Subject to any disclaimer, the term of this patent is extended or adjusted under 35 U.S.C. 154(b) by 27 days.

This patent is subject to a terminal disclaimer.

(21) Appl. No.: 17/707,355

(22) Filed: Mar. 29, 2022

(65) Prior Publication Data

US 2023/0049472 A1 Feb. 16, 2023

Related U.S. Application Data

(62) Division of application No. 16/552,753, filed on Aug. 27, 2019, now Pat. No. 11,286,690, which is a (Continued)

(51) Int. Cl.
*E05B 37/00* (2006.01)
*E05B 37/02* (2006.01)
(Continued)

(52) U.S. Cl.
CPC ........ *E05B 37/0058* (2013.01); *E05B 37/025* (2013.01); *E05B 67/003* (2013.01); *E05B 37/02* (2013.01); *E05B 73/0005* (2013.01)

(58) Field of Classification Search
CPC .. E05B 37/00; E05B 37/0048; E05B 37/0058; E05B 37/02; E05B 37/025;
(Continued)

(56) References Cited

U.S. PATENT DOCUMENTS 861,991 A 7/1907 Kone
1,117,417 A 11/1914 Meepos
(Continued)

FOREIGN PATENT DOCUMENTS

CN 2844341 Y 12/2006
DE 10309224 A1 9/2004
(Continued)

OTHER PUBLICATIONS

Canadian Office Action; Canadian Intellectual Property Office; Canadian Patent Application No. 3,151,810; May 4, 2023; 3 pages.
(Continued)

*Primary Examiner* — Nathan Cumar
(74) *Attorney, Agent, or Firm* — Taft Stettinius & Hollister LLP

(57) ABSTRACT

The present disclosure is directed to a combination lock including a housing configured to lockingly receive a locking link. The lock includes a plurality of outer dials and a plurality of inner dials, each selectively coupled to a corresponding outer dial. A spindle is positioned radially internal to the inner dials. A multiplier link is pivotably connected between the spindle and a locking bolt. Some forms of the combination lock include a tactile feedback mechanism and/or a combination reset mechanism.

20 Claims, 11 Drawing Sheets

Related U.S. Application Data division of application No. 15/643,549, filed on Jul. 7, 2017, now Pat. No. 10,392,835.

(51) Int. Cl.
*E05B 67/00* (2006.01)
*E05B 73/00* (2006.01)

(58) Field of Classification Search
CPC ........ E05B 67/00; E05B 67/003; E05B 73/00; E05B 73/0005; E05B 73/0011
USPC .......................................................... 70/315
See application file for complete search history.

(56) References Cited

U.S. PATENT DOCUMENTS

| | | | | |
|---|---|---|---|---|
| 1,565,132 | A | 12/1925 | Wildrick et al. | |
| 1,586,496 | A | 5/1926 | Wildrick | |
| 1,600,157 | A | 9/1926 | Wildrick | |
| 4,341,101 | A | 7/1982 | Bako | |
| 4,343,164 | A | 8/1982 | Bako | |
| 4,354,366 | A | 10/1982 | Bako | |
| 4,355,524 | A | 10/1982 | Bako | |
| 4,366,687 | A | 1/1983 | Atkinson | |
| 4,389,863 | A | 6/1983 | Bako | |
| 4,520,641 | A | 6/1985 | Bako | |
| 5,027,623 | A | 7/1991 | Ling | |
| 5,307,657 | A | 5/1994 | Klein et al. | |
| 5,636,539 | A | 6/1997 | Tsai | |
| 5,653,136 | A | 8/1997 | Huang | |
| 5,899,099 | A | 5/1999 | Tsai | |
| 5,934,120 | A | 8/1999 | Kuo | |
| 6,209,368 | B1 | 4/2001 | Lee | |
| 6,386,005 | B1 | 5/2002 | Kuo | |
| 6,422,051 | B1 | 7/2002 | Kuo | |
| 6,439,006 | B1 | 8/2002 | Tsai | |
| 6,508,089 | B1 | 1/2003 | Tsai | |
| 6,598,434 | B2 | 7/2003 | Yang | |
| 6,619,081 | B1 | 9/2003 | Yu | |
| 6,711,922 | B1 | 3/2004 | Tsai | |
| 6,799,445 | B1 | 10/2004 | Tsai | |
| 6,799,446 | B1 | 10/2004 | Tsai | |
| 6,845,643 | B2 | 1/2005 | Tsai | |
| 6,997,023 | B1 * | 2/2006 | Huang | E05B 37/0034 70/284 |
| 7,131,299 | B1 | 11/2006 | Huang | |
| 7,152,439 | B1 | 12/2006 | Chang | |
| 7,216,517 | B2 | 5/2007 | Ling et al. | |
| D545,174 | S | 6/2007 | Slian | |
| 7,254,971 | B2 * | 8/2007 | Ruan | E05B 37/025 70/21 |
| 7,337,637 | B2 | 3/2008 | Kan | |
| 7,357,007 | B2 | 4/2008 | Lin | |
| 7,370,497 | B2 | 5/2008 | Yu | |
| 7,415,853 | B2 | 8/2008 | Yu | |
| 7,434,430 | B2 | 10/2008 | Huang | |
| 7,467,529 | B1 | 12/2008 | Lai et al. | |
| 7,510,301 | B2 | 3/2009 | Dial | |
| 7,516,631 | B2 | 4/2009 | Hacker et al. | |
| 7,552,607 | B2 | 6/2009 | Yang | |
| 7,568,367 | B2 | 8/2009 | Huang | |
| 7,775,073 | B2 | 8/2010 | Green | |
| 7,832,238 | B2 * | 11/2010 | Misner | E05B 37/0034 70/432 |
| 7,870,764 | B2 | 1/2011 | Burmesch | |
| 7,946,141 | B2 | 5/2011 | Ng et al. | |
| 8,171,760 | B2 | 5/2012 | Yen et al. | |
| 8,225,630 | B1 | 7/2012 | Chen et al. | |
| 8,234,891 | B2 | 8/2012 | Dalton, Jr. et al. | |
| 8,353,184 | B2 | 1/2013 | Ling et al. | |
| 8,393,186 | B2 | 3/2013 | Schmidt et al. | |
| 8,453,481 | B2 | 6/2013 | Meekma | |
| 9,175,502 | B2 | 11/2015 | Zuraski et al. | |
| 9,267,312 | B2 | 2/2016 | Zuraski et al. | |
| 9,562,369 | B2 | 2/2017 | Kuo | |
| 9,670,695 | B2 | 6/2017 | Zuraski et al. | |
| 10,392,835 | B2 | 8/2019 | Ramakrishna et al. | |
| 2002/0134121 | A1 * | 9/2002 | Kuo | E05B 37/025 70/312 |
| 2004/0011098 | A1 * | 1/2004 | Yang | E05B 13/002 70/284 |
| 2006/0107708 | A1 | 5/2006 | Yu | |
| 2006/0162400 | A1 | 7/2006 | Kuo | |
| 2006/0169007 | A1 | 8/2006 | Fiegener | |
| 2007/0234765 | A1 | 10/2007 | Tsai | |
| 2007/0251282 | A1 * | 11/2007 | Huang | E05B 37/00 70/304 |
| 2008/0006067 | A1 | 1/2008 | Kar | |
| 2008/0011025 | A1 * | 1/2008 | Lin | E05B 39/00 70/21 |
| 2008/0011026 | A1 * | 1/2008 | Huang | E05B 35/105 70/21 |
| 2008/0022734 | A1 | 1/2008 | McDaid et al. | |
| 2008/0314093 | A1 | 12/2008 | Nave | |
| 2009/0145178 | A1 | 6/2009 | Nave et al. | |
| 2010/0064738 | A1 | 3/2010 | Yi | |
| 2010/0095718 | A1 * | 4/2010 | Lai | E05B 37/025 70/284 |
| 2010/0307208 | A1 | 12/2010 | Corbin et al. | |
| 2011/0041574 | A1 | 2/2011 | Yang | |
| 2011/0239715 | A1 | 10/2011 | Weiershausen | |
| 2013/0118219 | A1 | 5/2013 | Basche | |
| 2014/0041423 | A1 * | 2/2014 | Zuraski | E05B 37/0048 70/315 |
| 2016/0102475 | A1 | 4/2016 | Kuo | |
| 2018/0195314 | A1 | 7/2018 | Lanusse | |

FOREIGN PATENT DOCUMENTS

| | | | |
|---|---|---|---|
| GB | 988612 | A | 4/1965 |
| KR | 101121782 | B1 | 3/2012 |
| KR | 101160810 | B1 | 6/2012 |

OTHER PUBLICATIONS

Canadian Office Action; Canadian Intellectual Property Office; Canadian Patent Application No. 3,070,873; Mar. 16, 2021; 4 pages.
Extended European Search Report; European Patent Office; European Patent Application No. 18827572.1; Jul. 7, 2020; 8 pages.
International Search Report; International Searching Authority; International Patent Application No. PCT/US2018/041274; Dec. 13, 2018; 4 pages.
Written Opinion; International Searching Authority; International Patent Application No. PCT/US2018/041274; Dec. 13, 2018; 8 pages.
Extended European Search Report; European Patent Office; European Patent Application No. 23211298.7; Jun. 17, 2024, 8 pages.

* cited by examiner

COMBINATION LOCK

CROSS-REFERENCE TO RELATED APPLICATIONS

The present application is a divisional of U.S. patent application Ser. No. 16/552,753 filed Aug. 27, 2019 and issued as U.S. Pat. No. 11,286,690, which is a divisional of U.S. patent application Ser. No. 15/643,549 filed Jul. 7, 2017 and issued as U.S. Pat. No. 10,392,835, the contents of each application hereby incorporated by reference in their entirety.

TECHNICAL FIELD

The present disclosure generally relates to a combination lock and more particularly, but not exclusively to a combination lock with a unique locking and reset mechanism.

BACKGROUND

Combination locks typically include one or more rotatable dials operably coupled to an internal locking mechanism. Combination locks may have unlocking assemblies with a reset mechanism to change the lock combination. However, some existing systems have various shortcomings relative to certain applications. Accordingly, there remains a need for further contributions in this area of technology.

SUMMARY

One embodiment of the present disclosure includes a combination lock with an internal multiplier link connected between a spindle and a locking bolt. Other embodiments include apparatuses, systems, devices, hardware and methods for a combination lock having a unique reset mechanism and/or a unique tactile feedback mechanism. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
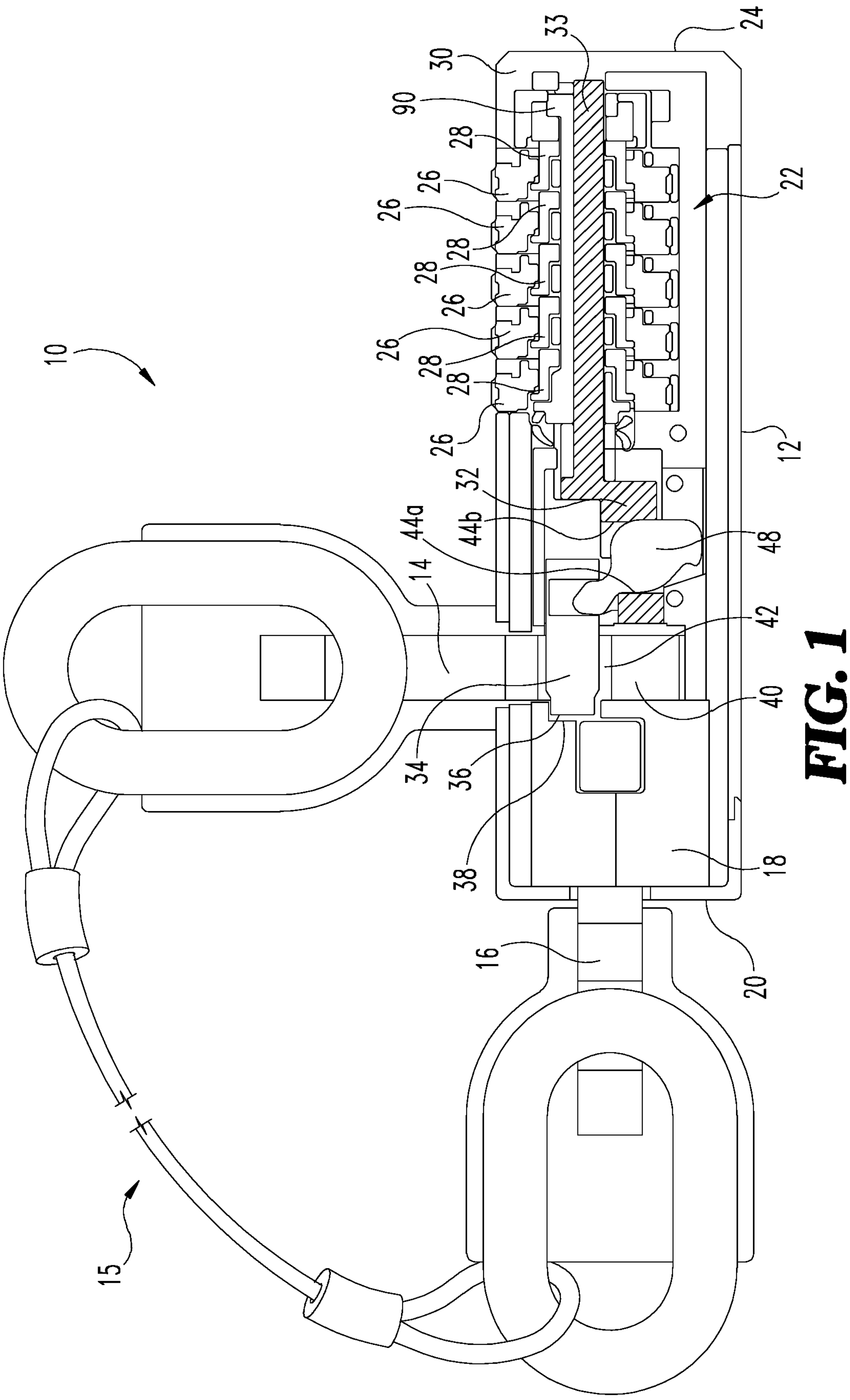
FIG. 1 is a cross-sectional view of a lock apparatus in a locked position according to one embodiment of the present disclosure.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
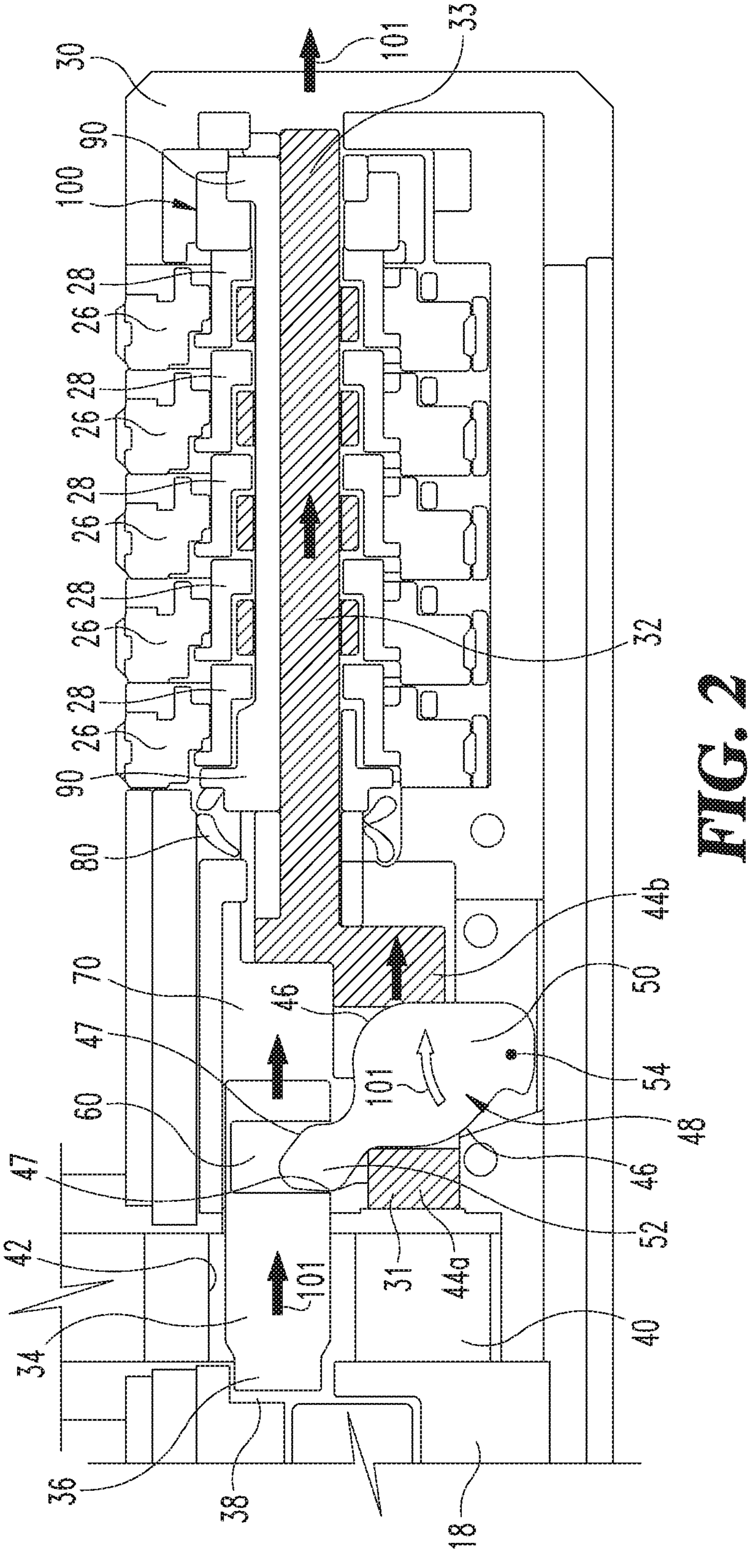
FIG. 2 is an enlarged cross-sectional view of a portion of the lock apparatus of FIG. 1.
Figure 3:
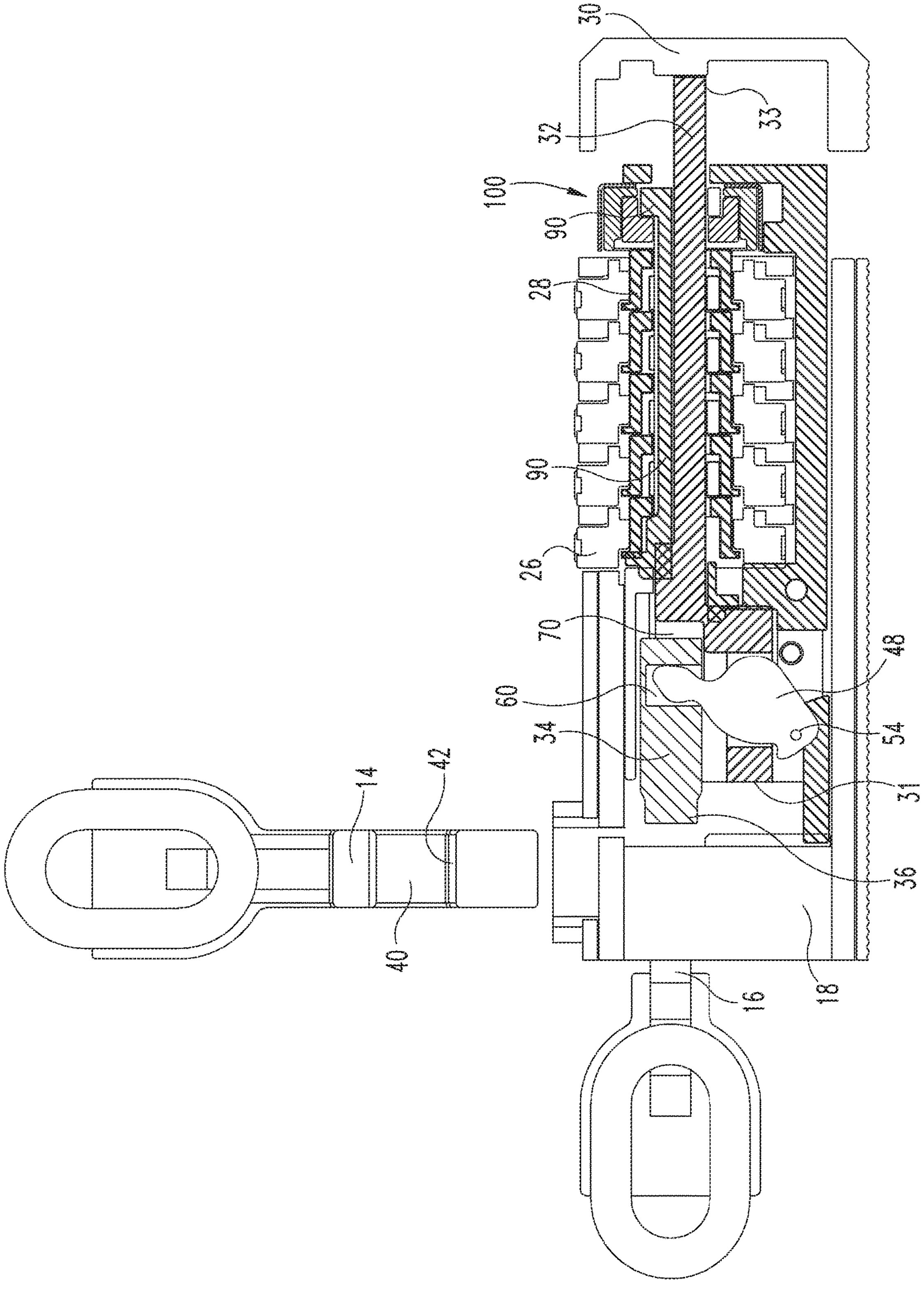
FIG. 3 is a cross-sectional view of the lock apparatus of FIG. 1 in an unlocked position.

Referring now to FIGS. 1-3, a lock apparatus 10 is illustrated in cross-sectional form. The lock apparatus 10 includes an outer lock housing 12 configured to contain internal components of the lock apparatus 10. A locking link 14 is removably connected to the housing 12. When the locking link 14 is in a locked position, the locking link 14 is prevented from disengaging from the housing 12. When the lock apparatus 10 is unlocked through a lock mechanism 22, the locking link 14 can be detached from the housing 12.

A fixed link 16 can be permanently connected to the housing 12. In one form the fixed link 16 can be coupled to an anchor support 18 positioned proximate a first end 20 of the housing 12. The locking link 14 and fixed link 16 may be connected together via a flexible member 15 such as a chain or cable or the like. The lock mechanism 22 can be positioned proximate a second end 24 of the housing 12. The lock mechanism 22 includes a plurality of outer dials 26 that can include a plurality of segments with numbers, letters or graphics so that a combination code may be set. When the outer dials 26 are set to the correct combination code, the lock mechanism 22 will release the locking link 14 from the housing 12. The lock mechanism 22 includes a plurality of inner dials 28 operable with the outer dials 26 so as to permit unlocking of the lock apparatus 10. The operation of the lock mechanism 22 is described in detail below.

A pull knob 30 is constructed proximate the second end 24 of the housing 12 such that when the outer dials 26 are set to the correct combination, the pull knob 30 may be pulled outward (in the direction of arrows 101 (FIG. 2)) from the lock housing 12. Movement of the pull knob 30 from the locked position (FIG. 1) to the unlocked position (FIG. 3) will cause certain connected components to move from a locked orientation to an unlocked orientation. A spindle 32 is operably connected between the pull knob 30 and a multiplier link 48. The multiplier link 48 in turn is engaged between the spindle 32 and a locking bolt 34. The multiplier link 48 is designed to provide mechanical advantage relative to the force and distance required to move the pull knob 30 and unlock the lock apparatus 10. In one form, the ratio of the travel distance of the locking bolt 34 to the travel distance of the pull knob 30 is up to 3 to 1. In other forms the distance ratio due to the multiplier link 48 can be greater than three to one.

The locking bolt 34 includes a bolt head 36 that can engage within a channel 38 formed in the anchor support 18 when the locking bolt 34 is in a locked position. The locking link 14 includes a bolt receiver 40 configured to extend into the lock housing 12. The bolt receiver 40 includes a bolt aperture 42 for the locking bolt 34 to engage therethrough and prevent the locking link 14 from being removed from the housing 12 when in a locked position.

The multiplier link 48 includes a multiplier link body 50 positioned between engagement portions 44*a*, 44*b* of the spindle 32 proximate the first end 31 of the spindle 32. The multiplier link body 50 includes a bulbous cross-section with arcuate surface portions 46 so as to permit variable contact lines with the engagement portions 44*a*, 44*b* of the spindle 32 as the multiplier link 48 pivots during locking and unlocking movement. The multiplier link body 50 necks down to a smaller multiplier link head 52 that extends into a bolt slot 60 formed within the locking bolt 34. The multiplier link head 52 of the multiplier link 48 also includes arcuate outer surfaces 47 designed to provide a smooth continuous cam-like actuation engagement with the locking bolt 34 as the multiplier link 48 pivots through an operating range of angles. The multiplier link 48 pivots about a pivot 54 when the spindle 32 is moved in the direction of the arrows 101 during an unlocking sequence and opposite of the arrows 101 in a locking sequence. When the spindle 32 moves toward the second end 24 the lock housing 12 in the direction of arrows 101, the multiplier link 48 will pivot clockwise about the pivot 54 causing the multiplier link head 52 to generate a force into the locking bolt 34 through the bolt slot 60. The locking bolt 34 will retract out the bolt locking aperture 42 of the bolt receiver 40 and slide into a bolt cylinder 70 in an unlocked position as shown in FIG. 3.

A lock reset mechanism 100 is operable for permitting a lock combination to be reset to a different combination. The reset mechanism 100 includes bias member 80 disposed between a reset plate 90 and a portion of the housing 12. The bias member 80 is operable to urge the reset plate 90 in the direction of arrows 101. Operation of the reset mechanism 100 will be further described below.

Figure 4:
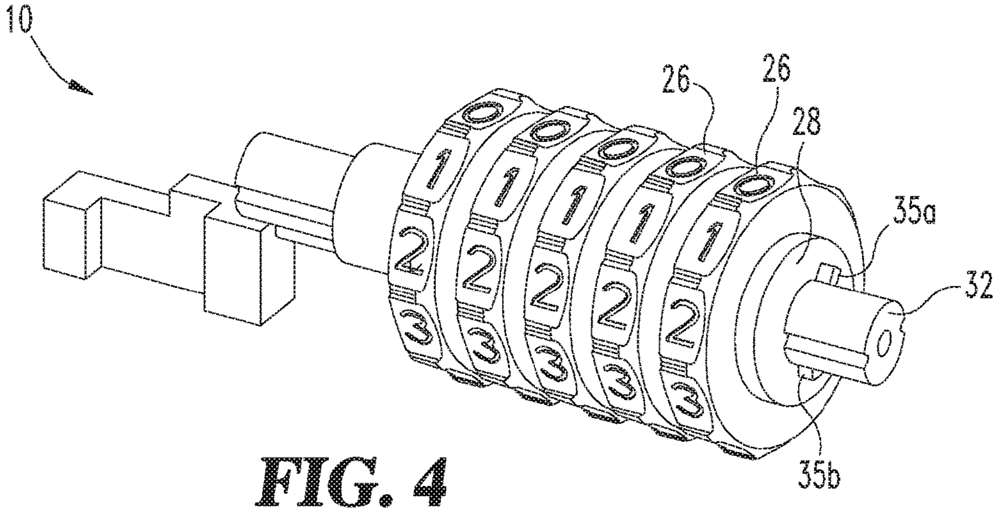
FIG. 4 is a perspective view of a portion of the lock apparatus of FIG. 1 illustrating outer dials assembled onto a spindle.
Figure 5:
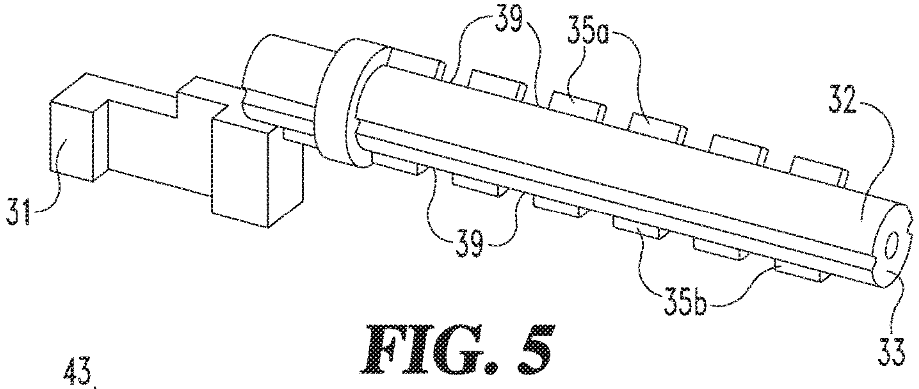
FIG. 5 is a perspective view of a spindle.
Figure 6:
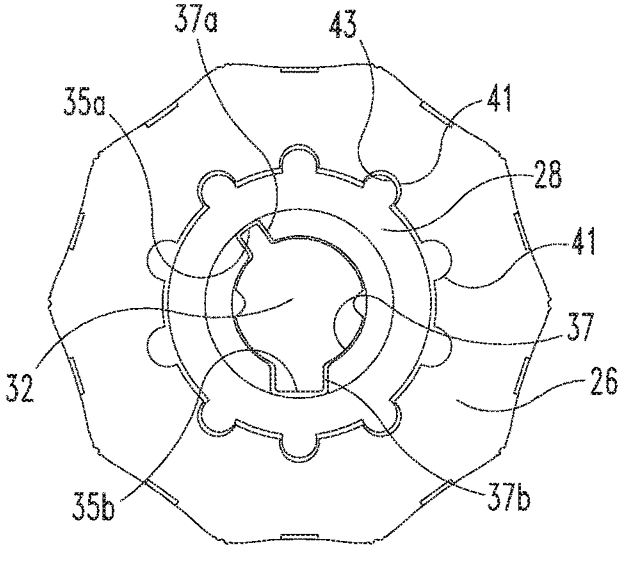
FIG. 6 is a cross-sectional view of FIG. 4 illustrating an outer dial, an inner dial and a spindle.
Figure 7:
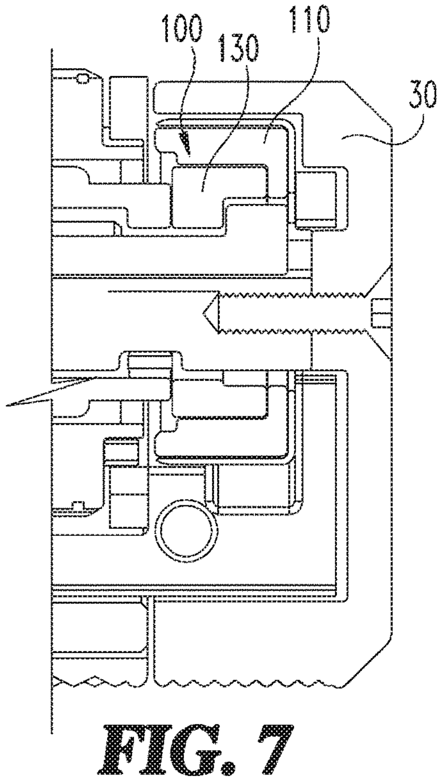
FIG. 7 cross-sectional view of a portion of the lock apparatus of FIG. 1 showing a reset mechanism according to one embodiment of the present disclosure.
Figure 8:
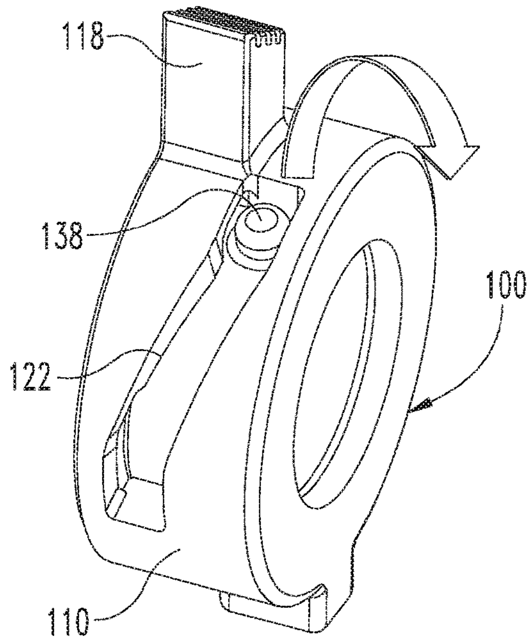
FIG. 8 is a perspective view of a portion of the lock reset mechanism.
Figure 9:
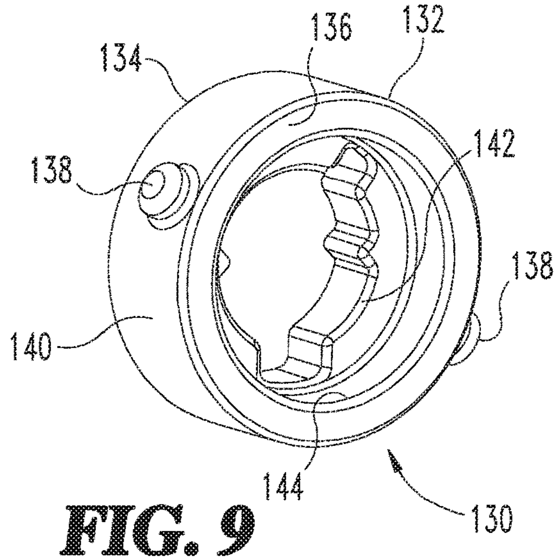
FIG. 9 is a perspective view of a lock reset housing according to one embodiment of the present disclosure.
Figure 10:
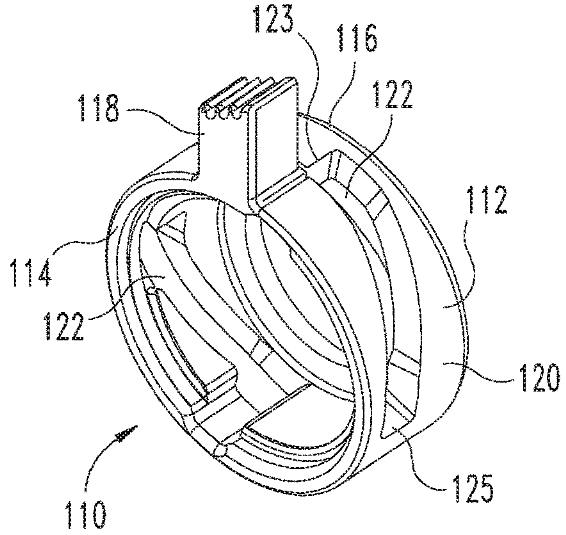
FIG. 10 is a perspective view of a lock reset cam according to one embodiment of the present disclosure.

Referring now to FIGS. 4-6, portions of the lock apparatus 10 is further described. Referring specifically to FIG. 4 a plurality of outer dials 26 can be engaged about a plurality of corresponding inner dials 28 and assembled onto a spindle 32. The spindle 32 includes a plurality of first lock tabs 35*a* and a plurality of second lock tabs 35*b* each positioned intermittently along a length of the spindle 32 between the first and second ends 31 and 33. In some forms, the first lock tabs 35*a* can have a different size and/or shape than the second lock tabs 35*b*. A lock tab channel 39 (FIG. 5) is formed between adjacent pairs of both the first lock tabs 35*a* and the second lock tabs 35*b*. Referring more particularly to FIG. 6, each outer dial 26 includes a plurality of detents 41 intermittently formed around an inner portion thereof. Each inner dial 28 includes a plurality of protrusions 43 intermittently formed on an outer portion thereof. In certain orientations of the inner and outer dials 28, 26, one or more detents 41 of each outer dial 26 can selectively engage with one or more of protrusions 43 of a corresponding inner dial 28. Each inner dial 28 includes an inner circular rim 37, with a first lock slot 37*a* and a second lock slot 37*b* formed therein. The first and second lock slots 37*a*, 37*b* are configured to correspond with a size and shape of the first lock tabs 35*a* and second lock tabs 35*b* of the spindle 32, respectively. During operation, the inner dials 28 are axially positioned so that the inner rim 37 can rotate around the spindle 32 and through a corresponding lock tab channel 39 between adjacent lock tabs 35*a* and 35*b*. In the event of an attempt to actuate the pull knob 30 without the correct combination being set, the inner rim 37 will engage with the protruding lock tabs 35*a*, 35*b* and prevent the spindle 32 from moving axially and unlocking the lock apparatus 10. When the outer dials 26 are rotated to the correct combination, the inner dials 28 are rotated therewith such that the first lock slot 37*a* and second lock slot 37*b* of the inner dials 28 are circumferentially aligned with the first lock tabs 35*a* and the second lock tabs 35*b* of the spindle 32, respectively. In this orientation the first and second lock tabs 35*a*, 35*b* of the spindle 32 can slide in the axial direction through the lock slots 37*a*, 37*b* such that the locking bolt 34 will disengage from the bolt receiver 40 and permit release of the locking link 14 (see FIG. 3).

Referring now to FIGS. 7-13, the lock rest mechanism 100 is disclosed according to one embodiment of the present disclosure. The lock reset mechanism 100 includes a reset housing 110 with a reset cam 130 rotatably disposed therein. The lock reset housing 110 can include a circular body 112 having a first side 114 and an opposing second side 116. A reset knob 118 extends from an outer perimeter wall 120 of the body 112. At least one spiral slot 122 is formed through the outer wall 120 of the body 112. In some forms two or more spiral slots 122 may be formed with the lock reset housing 110. The spiral slot 122 extends between a first end 123 and a second end 125. The spiral slot 122 traverses from a point in the vicinity of the first side 114 toward the second side 116 of the body as the spiral slot 122 traverses between the first and second ends 123, 125.

The reset cam 130 includes a circular cam body 132 having first and second opposing sides 134, 136, respectively. One or more posts 138 extend from an outer wall 140 of the circular cam body 132. The one or more posts 138 of the reset cam 130 are shaped and configured to slidingly engage within a corresponding spiral slot 122 of the reset housing 110. The reset cam 130 is assembled within the reset housing 110 such that the reset cam 130 is axially slidable with respect to the reset housing 110. In the operation, the reset knob 118 can be actuated or otherwise moved between first and second position which causes the reset housing 110 to rotated about the reset cam 130 within the lock housing 12. As the reset housing 110 is rotated, the posts 138 of the reset cam 130 will follow along a length of the one or more spiral slots 122 which in turn cause the reset cam 130 to move in an axial direction either with or opposite of the direction arrows 101 (FIG. 2) depending on the direction of rotation of the reset housing 110. The reset cam 130 can include a spindle engagement region 142 formed with an interior portion 144 of the cam body 132. The engagement region 142 permits sliding engagement with the spindle 32 along a longitudinal axial direction when the reset housing 110 is rotated.

Figure 12:
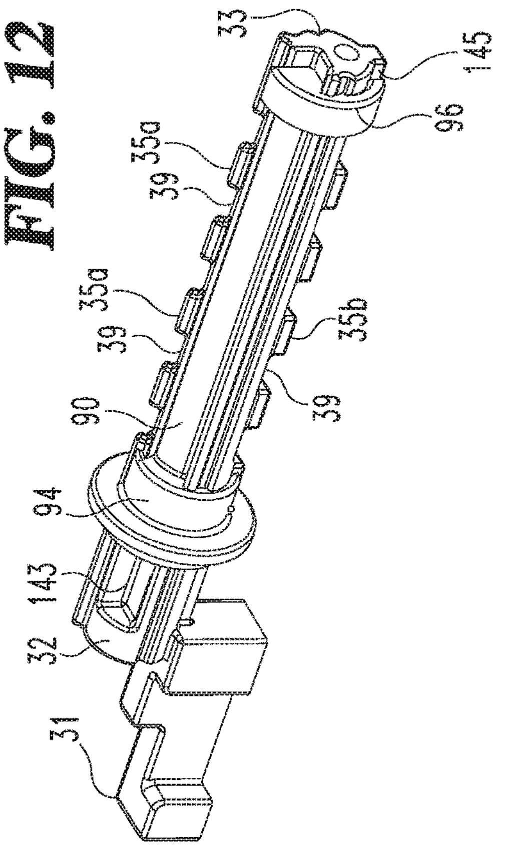
FIG. 12 is a perspective view of FIG. 11 with the inner dials removed.
Figure 11:
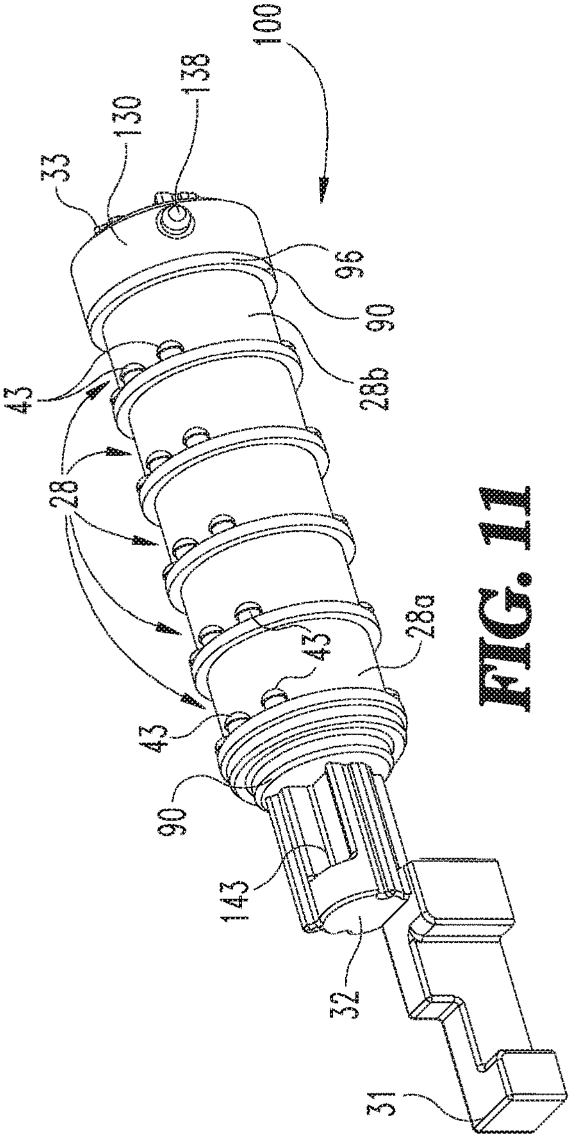
FIG. 11 is a perspective view of a portion of the reset mechanism of FIG. 7 showing a reset plate, inner dials, and a reset cam assembled to a spindle.
Figure 13:
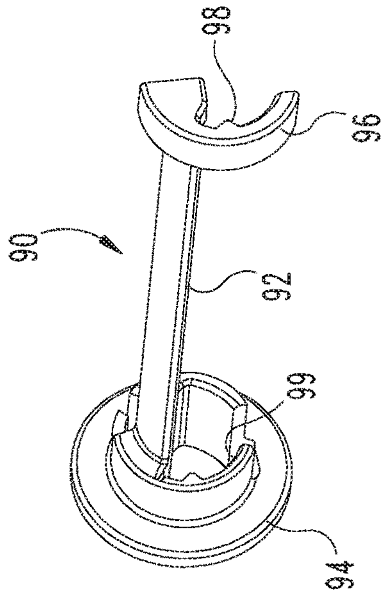
FIG. 13 is a perspective view of the reset plate.

Referring now more specifically to FIGS. 11-13, perspective views of portions of the lock reset mechanism 100 are illustrated, FIG. 11 shows the spindle 32, a reset plate 90, inner dials 28 and a reset cam 130 in perspective view. FIG. 12 shows a portion of the lock reset mechanism 100 with the inner dials 28 removed to more clearly show the reset plate 90 positioned within a groove 143 formed in the spindle 32 therein, FIG. 13 depicts a perspective view of the reset plate 90. The reset plate 90 includes an elongated slat 92 extending between a reset plate head 94 and a reset plate end guide 96. The reset plate 90 is slidingly coupled with the spindle 32, The head 94 of the reset plate 90 encompasses the spindle 32 while the elongated slat 92 slidingly engages the spindle 32 within a plate groove 143 defined along a longitudinal length of the spindle 32 between the first and second ends 31, 33 respectively. The head 94 of the reset plate 90 includes an inner profile 99 configured to permit sliding engagement with spindle 32 along a length thereof.

The end guide 96 of the reset plate 90 also includes an inner profile 98 substantially conforming to an outer profile 145 formed along a portion of the spindle 32. The inner profile 98 of the end guide 96 permits sliding movement along the outer profile 145 of the spindle 32 in an axial direction while preventing separation of the end guide 96 and spindle 32 in a transverse direction. The inner dials 28 are positioned on the reset plate 90 such that the head 94 and the end guide 96 are located and engaged with the outer extremes of the distal inner dials 28*a* and 28*b*. In this manner, the inner dials 28 are "trapped" axially between the head 94 and the end guide 96. When the reset plate 90 is moved axially along the groove 143 in the spindle 32, the inner dials 28 will likewise move axially with the reset plate 90, When the inner dials 28 are moved axially such that the protrusions 43 of the inner dials 28 are no longer engaged with the detents 41 of the outer dials 26, the outer dials 26 can be freely rotated without rotatingly driving the inner dials 28 and thus the lock combination can be reset to a new opening combination.

In operation, the outer dials 26 are rotated to the correct combination which permits the pull knob 30 to be moved in the direction of arrows 101 and exposing reset knob 118. The reset knob 118 can then be rotated causing the reset cam 130 to move axially opposite of arrows 101 and move the reset plate 90 and in turn the inner dials 28 out of engagement with outer dials 26. The outer dials 26 can then be freely rotated to a new combination and the reset knob 118 is then rotated back in the opposite direction permitting the reset plate 90 to move back to the original position under the urging of the bias member 80 (FIG. 1). In this position the inner dials 28 are once again in working engagement with the outer dials 26 and a new combination is set.

Figure 14:
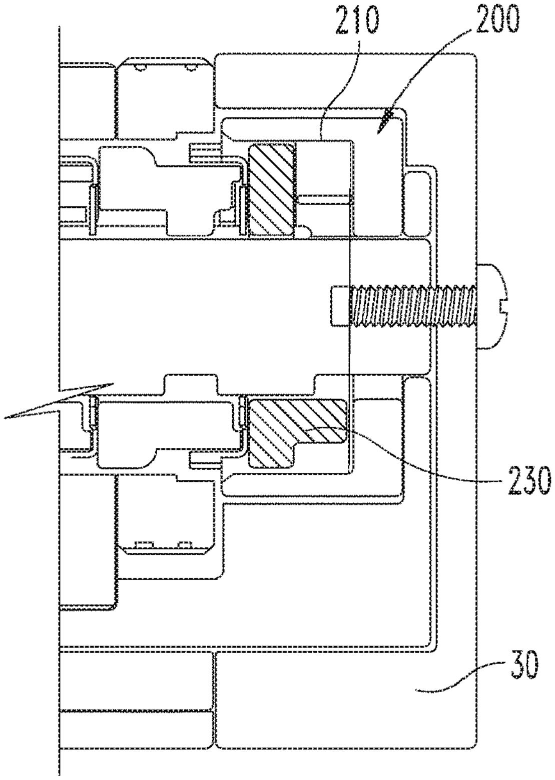
FIG. 14 cross-sectional view of a portion of the lock apparatus of FIG. 1 showing a reset mechanism according to another embodiment of the present disclosure.
Figure 15:
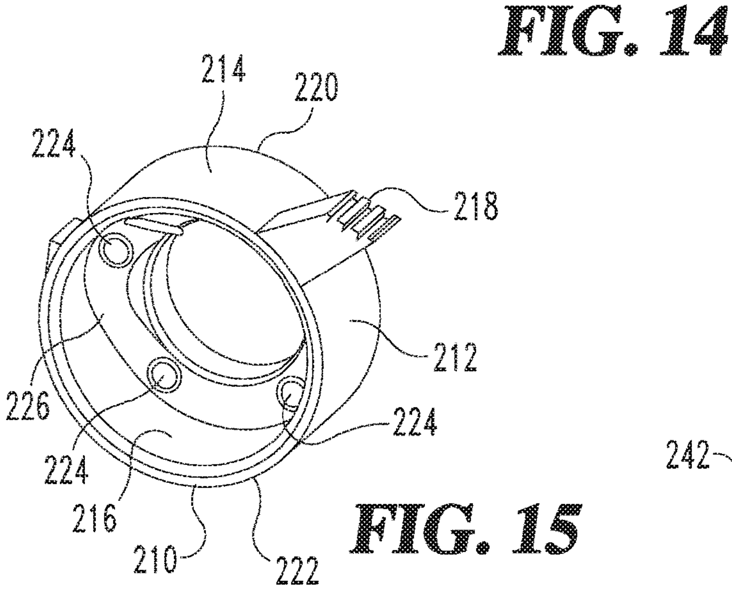
FIG. 15 is a perspective view of a lock reset housing for the lock reset mechanism of FIG. 14.
Figure 16:
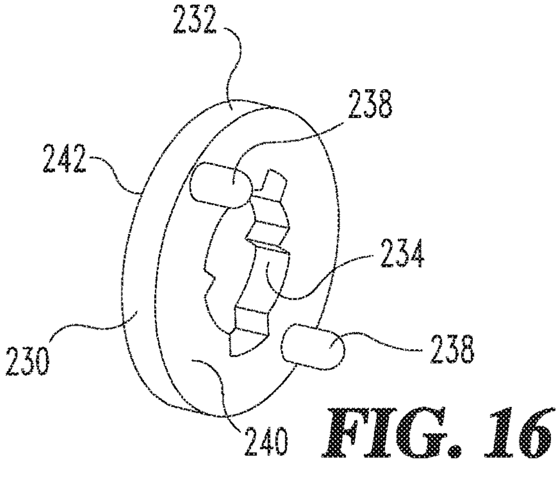
FIG. 16 is a perspective view of a lock reset cam for the lock reset mechanism of FIG. 14.

Referring now to FIGS. 14-16, another lock reset mechanism 200 is illustrated according to an alternate embodiment of the present disclosure. The operation of the lock reset mechanism 200 is similar to the lock reset mechanism 100. FIG. 14 shows the lock reset mechanism 200 in cross-sectional form. The lock reset mechanism 200 includes a pull knob 30, similar to the pull knob in other embodiments. FIG. 15 shows a perspective of an alternate reset housing 210 and FIG. 16 depicts an alternate reset cam 230.

The reset housing 210 is positioned internal to the pull knob 30 when the pull knob 30 is in a closed or locked position. A reset knob 218 of the reset housing 210 is accessible when the correct combination to unlock the lock apparatus 10 is set by the outer dials 26 (FIG. 4) and the pull knob 30 is moved to an open position as previously described. The reset housing 210 includes a substantially circular body 212 defined by an outer perimeter wall 214 and an inner wall 216 extending between a first side wall 220 and a second side wall 222. A spiral ramp 226 extends from the inner wall 216 in a manner that progressively moves closer to one side 220 or 222 between distal ends of the ramp 226. The spiral ramp 226 can include one or more tab recess features 224 formed therein to define locations for the cam 230 to releasably engage therewith and provide indication of a reset location.

Referring now to FIG. 16, the cam 230 can include an outer wall 232 which is positioned internal to the inner wall 216 of the reset housing 210 (FIG. 15). The outer wall 232 extends between a first and second side wall 240, 242, respectively. A spindle engagement region 234 formed proximate an inside diameter of the cam 230 is configured to slidingly engage with the spindle 32 (FIG. 11) along a longitudinal axial direction when the reset housing 210 is rotated. The cam 230 can include one or more cam tabs 238 extending from the first side wall 240 of the cam 230. The one or more cam tabs 238 of the cam 230 will slidingly engage with the spiral ramp 226 (FIG. 15) such that as the reset knob 218 is actuated the cam 230 will move in the axial direction either towards or away from the pull knob 30 (FIG. 4) depending upon the direction of rotation of the reset housing 210 (FIG. 15). When the cam 230 moves in an opposite direction to that of arrows 101 (FIG. 2) the reset plate 90 (see FIGS. 12 and 13) will be moved in an axial direction causing the inner dials 28 to move and disengage from the outer dials 26 as described with the previous combination reset mechanism 100. In this configuration, the outer dials 26 (FIG. 4) can be set to any desired combination and when the reset knob 218 is rotated back to the initial position, the inner dials 28 (FIG. 11) will then be moved back into engagement with the outer dials 26 causing the new combination to be set.

Figure 18:
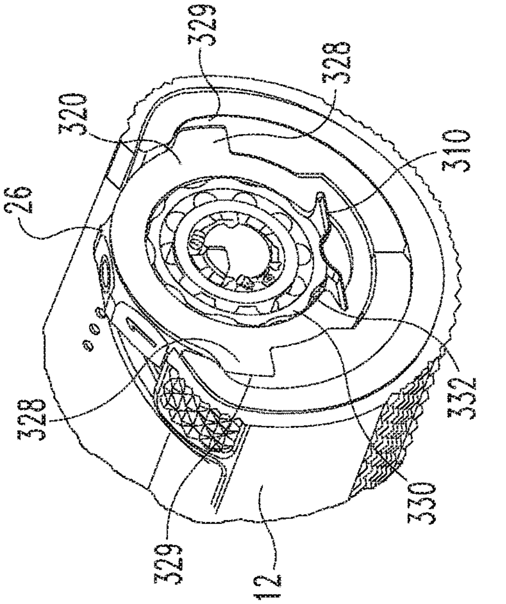
FIG. 18 is a perspective view of a portion of the tactile feel mechanism of FIG. 17.
Figure 21:
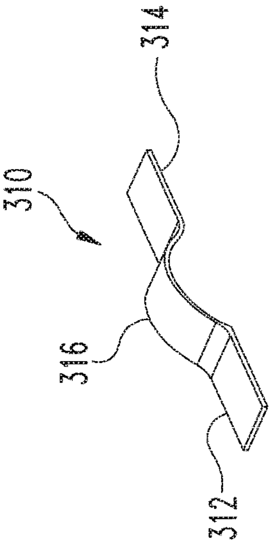
FIG. 21 is a perspective view of a leaf spring for the tactile feel mechanism of FIG. 17.
Figure 19:
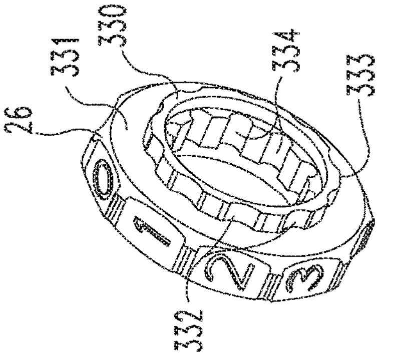
FIG. 19 is a perspective view of an outer dial with a detent ring for the tactile feel mechanism of FIG. 17.
Figure 17:
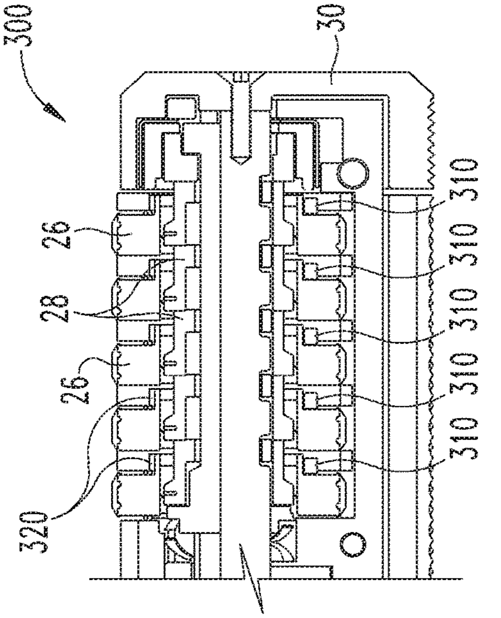
FIG. 17 is a cross-sectional view of a portion of a lock apparatus having a tactile feel mechanism according to one embodiment of the present disclosure.
Figure 20:
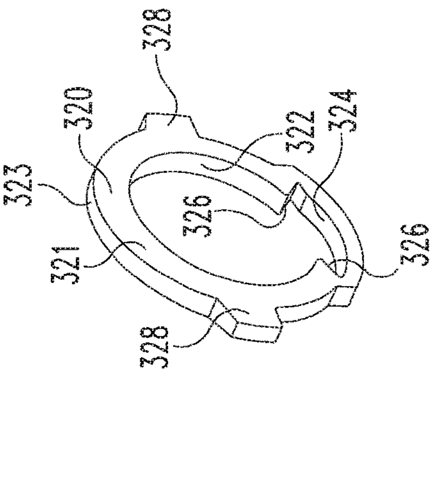
FIG. 20 is a dial spacer for the tactile feel mechanism of FIG. 17.

Referring now to FIGS. 17-21, a feel spacer mechanism 300 according to one embodiment is illustrated therein. FIG. 17 illustrates a portion of the feel spacer mechanism 300 section wherein a dial spacer 320 and a leaf spring 310 are positioned adjacent each of the outer dials 26. FIG. 18 shows an enlarged perspective partial cut-away view of a portion of the lock housing 12. An outer dial 26 is positioned adjacent a dial spacer 320 with a leaf spring 310 assembled therewith. FIGS. 19-21 illustrate perspective views of an outer dial 26, a dial spacer 320 and a leaf spring 310 respectively. The dial spacer 320 is defined by a ring 321 having an arcuate inner wall 322 and an arcuate outer wall 323. The dial spacer 320 includes a spring holding slot 324 formed in a portion of the inner wall 322. The spring holding slot 324 includes angled end walls 326 configured to hold a leaf spring 310 in a fixed position relative to the dial spacer 320. The dial spacer 320 can also include one or more anti-rotation ears 328 to lockingly engage with an ear receiving slot 329 (FIG. 18) formed with the lock housing 12.

Each outer dial 26 can include a detent ring 330 (FIG. 19) extending from a side wall 331 of the outer dial 26. The detent ring 330 includes a plurality of outer detents 332 formed in an outer perimeter wall 333 thereof. In this form, the detent ring 330 can also include a plurality of inner detents 334 configured to engage with the protrusions 43 (FIGS. 6, 11) of the inner dials 28 as described previously. The leaf spring 310 includes an arcuate region 316 formed between first and second end legs 312, 314, respectively extending in opposite directions. The first and second legs 312, 314, can be inserted into the spring holding slot 324 of the dial spacer 320 such that the angled end walls 326 partially overlap a portion of the first and second legs 312, 314. The slot 324 and the angled end walls 326 prevent the leaf spring 310 from moving radially inward or outward relative to the dial spacer 320. The sidewalls 331 of the outer dials 26 will restrict axial movement of the leaf springs 310 in an assembled configuration.

The feel spacer mechanism 300 operates to provide feedback in a form of an additional rotational resistance transmitted through to the outer dial 26 when the arcuate detent 316 of the leaf spring 310 is engaged with one of the outer detents 332 in the detent ring 330. Each detent 332 corresponds to a number, letter or other graphic on the outer dial 26. As the outer dial 26 is rotated, the detent ring 330 will rotate across the arcuate detent engagement region 316 of the leaf spring 310, which will generate haptic feedback in the form of variable rotational resistance. The rotational resistance is lower when the arcuate detent engagement region 316 is between adjacent detents 332 in the wall 333 of the detent ring 330. In this manner, the outer dial 26 can be located in an orientation that is positively located on a desired number and not partially between two numbers which would prevent unlocking of the lock 10.

Figure 22:
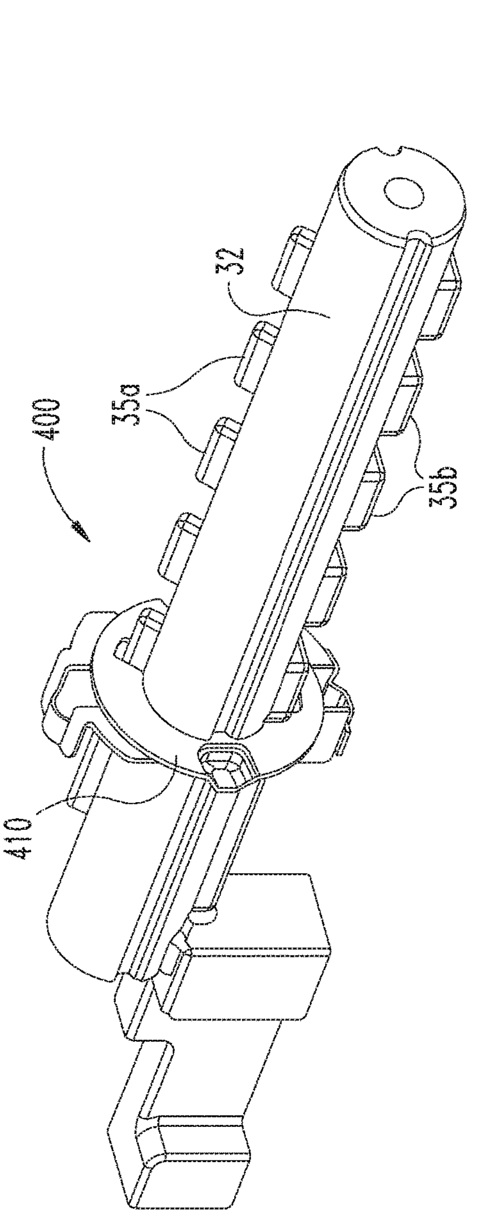
FIG. 22 is a perspective view of a portion of a lock apparatus having a tactile feel mechanism according to another embodiment of the present disclosure.
Figure 24:
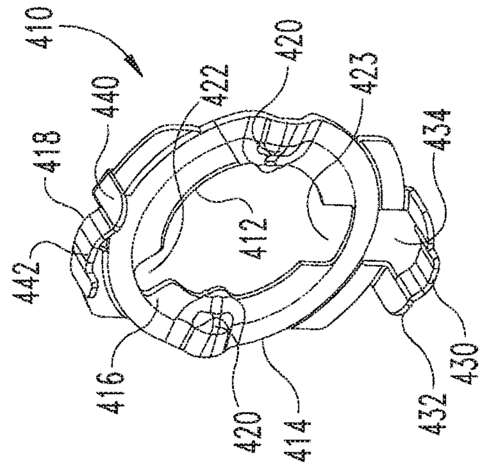
FIG. 24 is a perspective dial pacer for the tactile feel mechanism of FIG. 22.
Figure 23:
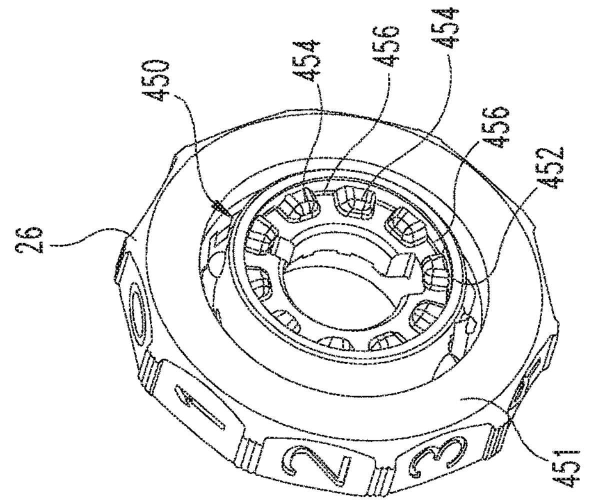
FIG. 23 is a perspective view of an outer dial with a detent ring for the tactile feel mechanism of FIG. 22.

Referring now to FIGS. 22-24, a feel spacer mechanism 400 according to another embodiment is illustrated therein. FIG. 22 illustrates the spindle 32 with a spacer 410 positioned proximate one end thereof. The spacer 410 shown in FIG. 24 includes an arcuate inner wall 412 engageable about the spindle 32 and an opposing outer perimeter wall 414. The spacer 410 includes a first side wall 416 and an opposing second side wall 418 extending between the inner wall 412 and the outer wall 414. The first side wall 416 of the spacer 410 can include one or more bump elements 420 protruding in axial direction (along a longitudinal axis of the spindle 32) away from the first side wall 416. A first slot 422 and a second slot 423 can be formed in the inner wall 412 between the bump elements 420. A first outer extension 430 can extend from the outer perimeter wall 414 and can include an arcuate overhang 432 projecting axially away from the first side 416 of the spacer 410. An opening 434 can be formed between the first outer extension 430 and the outer perimeter wall 414. A second overhang wall 442 including an outer extension 440 projecting from the outer perimeter wall 414 can be formed opposite of the first outer extension 430.

Referring more particularly to FIG. 23, the outer dial 26 can include a detent ring 450 extending from a side wall 451 thereof. The detent ring 450 can include a plurality of protrusions 454 extending radially inward from an inner rim 452 of the detent ring 450. A plurality of detent regions 456 is formed between each of the plurality of adjacent protrusions 454. In operation when the outer dial 26 is rotated, the one or more bump elements 420 (FIG. 24) of the spacer 410 will engage with detent ring 450 such that the positive tactile feedback is transmitted through the outer dial 26 as the bump elements 420 generate greater resistance to rotation when located in a detent region 456. Each detent region 456 corresponds to a number on the outer dial 26. The outer dial 26 transmits a lower rotational resistance when located in a position that is partially between two numbers on the outer dial 26. In this manner, the outer dial 26 can be located in an orientation that is positively on desired number due to tactile feedback transmitted by interaction between the feel spacer 410 and the outer dial 26.

Figure 25:
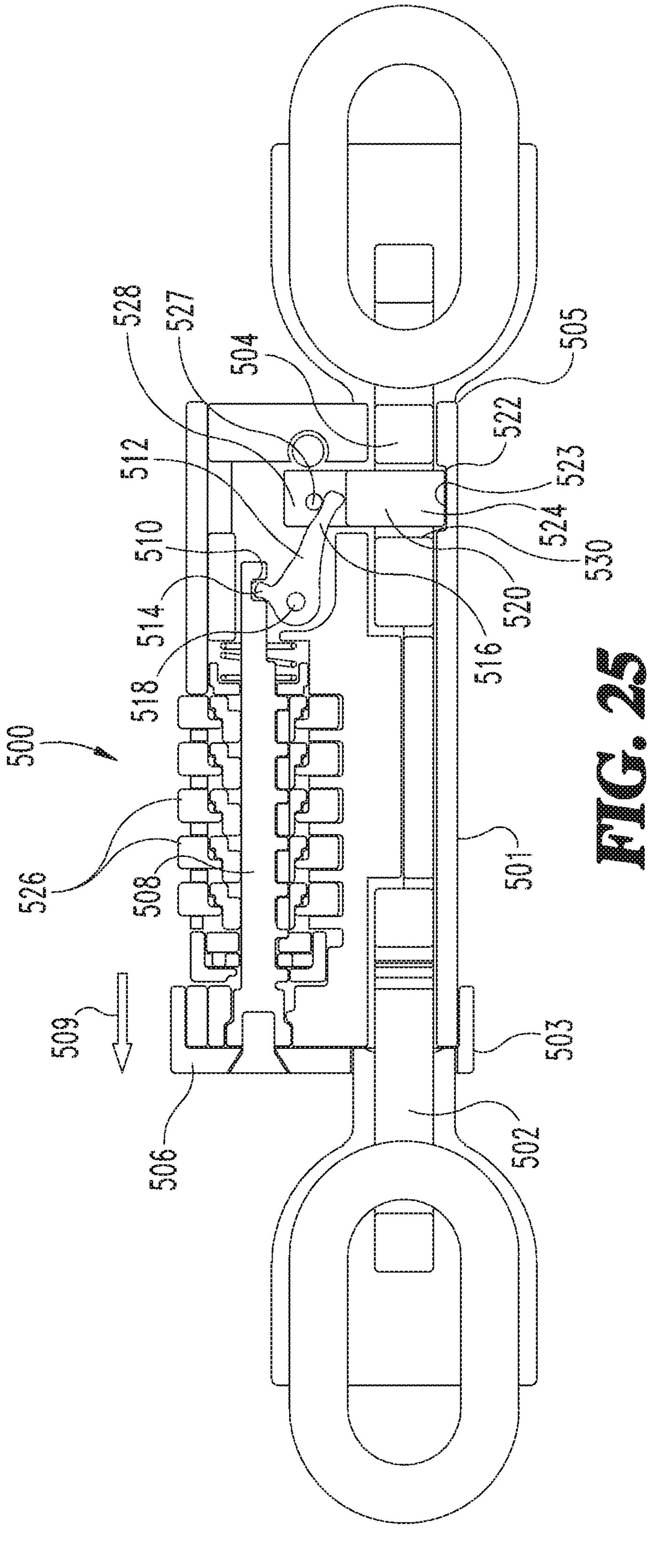
FIG. 25 is a cross-sectional view of a lock apparatus in a locked position according to another embodiment of the present disclosure.
Figure 26:
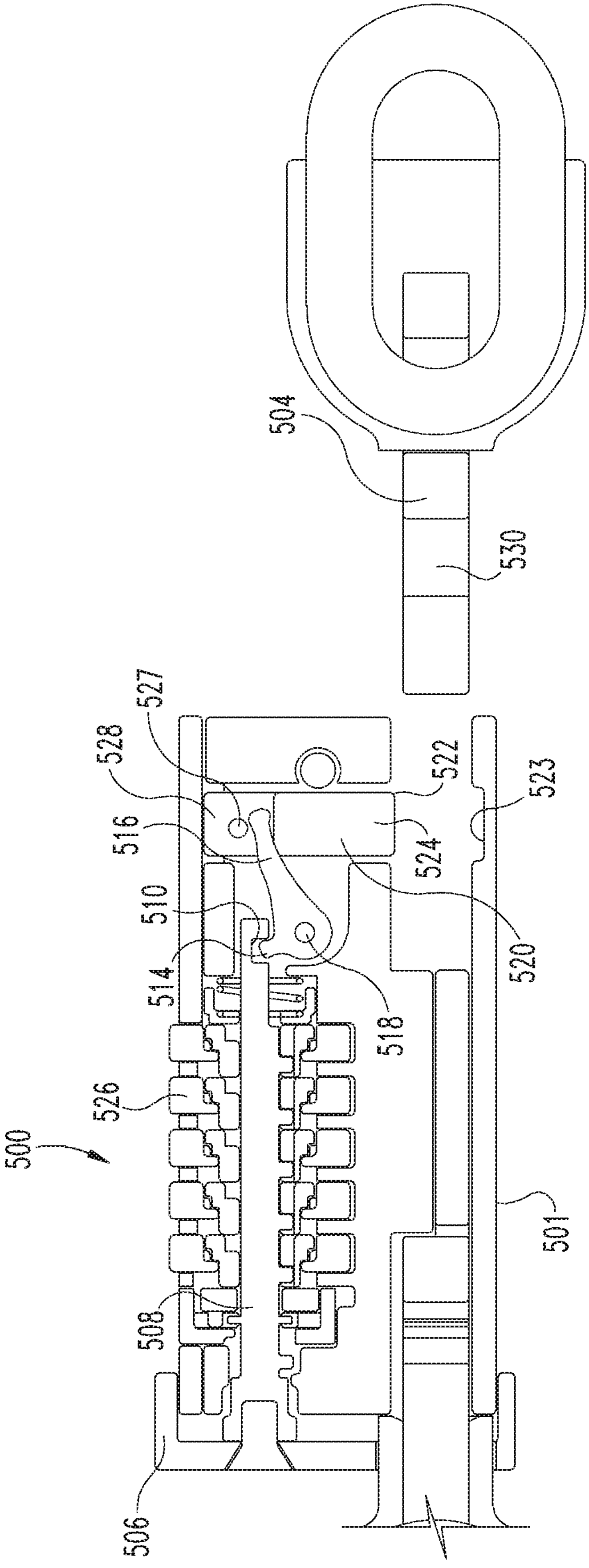
FIG. 26 is a cross-sectional view of the lock apparatus of FIG. 25 in an unlocked position.

Referring now to FIGS. 25 and 26, cross-sectional views of an alternate lock apparatus 500 is illustrated in a locked configuration and an unlocked configuration respectively. The lock apparatus 500 can be similar to the lock apparatus 10 in certain aspects such as by way of example, having reset mechanisms and tactile feel mechanisms as described above. The lock apparatus 500 includes a housing 501 having a first end 503 and a second end 505. A fixed link 502 is coupled to the housing proximate the first end 503 of the housing 501. A locking link 504 is releasably locked to the housing 501 proximate the second end 505 of the housing 501. In this embodiment, the fixed link 502 and the locking link 504 extend outward on opposite sides of the housing 501. The lock apparatus 500 includes a pull knob 506 connected to a spindle 508 in similar fashion to that of previously disclosed embodiments. When the correct combination is set with the outer dials 526, the pull knob 506 can be actuated by pulling the pull knob 506 in an axial direction defined by an arrow 509. A link slot 510 is formed in the spindle 508 proximate at a distal end opposite of the pull knob 506.

A multiplier link 512 is pivotably connected to the housing 501 through a pivot 518. The multiplier link 512 is connected to the link slot 510 of spindle slot 508 with a first leg 514 extending from the pivot 518. The multiplier link 512 includes a second leg 516 extending from the pivot 518 in a different direction from the first leg 514. The distance between the pivot 518 and the second leg 516 is greater than a distance between the pivot 518 and the first leg 514. A locking bolt 520 extends between a first end 524 and a second end 528 in a direction that is substantially perpendicular to the longitudinal axis of the spindle 508. The locking bolt 520 includes a connection joint 527 configured to receive and connect with the second leg 516 of the multiplier link 512. The multiplier link 512 is designed to provide mechanical advantage to the pull knob 506 such that a distance that the locking bolt 520 is greater than the distance that the pull knob 506 and spindle 508 moves. In some forms the ratio of distance traveled by the locking bolt 520 relative to the pull knob 506 can be up to three to one or even greater. The locking bolt 520 includes a bolt head 522 proximate the first end 524 thereof. The locking bolt 520 engages through a bolt receiver 530 formed with the locking link 504 in a locked configuration. In some forms the bolt head 522 of the locking bolt 520 can engage with a receiving channel 523 formed in the housing 501.

FIG. 26 illustrates the alternate locking apparatus 500 in an unlocked orientation after the correct combination has been set with the outer dials 526. The pull knob 506 can be moved in a first direction defined by arrow 509 (FIG. 25) causing the spindle 508 to move in the same direction and rotate the multiplier link 512 in a counter clockwise direction relative to the pivot 518. The locking bolt 520 is driven upward by the rotation of the multiplier link 512 so as to disengage the locking bolt 520 from the bolt receiver 530 and unlock the locking link 504 from the lock housing 501.

In one aspect the present disclosure includes combination lock comprising a housing configured to lockingly receive a locking link; a plurality of outer dials; a plurality of inner dials, each of the inner dials selectively coupled to a corresponding outer dial; a spindle positioned radially internal to the inner dials; a multiplier link pivotably connected to the spindle; and a locking bolt having a slot configured to receive a portion of the multiplier link.

Refining aspects include a pull knob connected to the spindle; wherein the pull knob is movable between a first position and a second position corresponding to a locked and unlocked position, respectively; wherein the multiplier link includes a body portion engaged within an abutment region formed with the spindle; wherein the multiplier link includes a head extending from the body, the head configured to engage within the slot of the locking bolt; an anchor support positioned within the housing; wherein the anchor support permanently couples a fixed link to the housing; wherein the anchor support includes a channel operable to receive a portion of the locking bolt in a locked position; including a lock reset mechanism comprising a reset plate slidably engageable with an elongate longitudinal slot formed in the spindle and configured to hold the inner dials between a head and an end guide; a rotatable reset housing positioned proximate one end of the spindle; and a reset cam positioned within the reset housing, the reset cam configured to move the reset plate and inner dials in a axial direction to a reset position when the reset housing is rotated from a first position to a second position.

Another aspect of the present disclosure includes a housing configured to support a plurality of outer dials; a plurality of inner dials, each of the inner dials selectively coupled to a corresponding outer dial; a spindle engaged with the inner dials; a dial spacer positioned adjacent an outer dial; and a tactile feedback mechanism defined between the dial spacer and the outer dial.

Another refining aspect, the spacer includes a spring holding slot with angled end walls to hold the first and second end legs in a fixed radial location, wherein tactile feedback mechanism includes a detent ring extending from a side of the outer dial, a plurality of detents formed around an outer wall of the detent ring; and wherein the arcuate region of the spring is engaged with the detent ring; wherein the tactile feedback mechanism includes one or more bump elements extending from a sidewall of the spacer; wherein the outer dial incudes a detent ring extending from a side thereof, a plurality of protrusions projecting radially inward from an inner rim of the detent ring; and a detent region formed between each adjacent pair of protrusions; and wherein the one or more bump elements of the spacer is engaged with the detent ring of the outer dial.

Another aspect of the present disclosure includes a housing configured to releasably lock a locking link; a plurality of outer dials rotatably connected to the housing; a spindle disposed internal to the outer dials; a reset plate slidably engaged with the spindle; a plate head and an end guide positioned at distal opposing ends of the reset plate; a plurality of inner dials positioned about the spindle and held between the plate head and guide of the reset plate, and a combination reset mechanism including a cam disposed in a cam housing operable for moving the reset plate and inner dials in an axial direction to selectively disengage the inner dials from the outer dials.

Refining aspect includes an apparatus wherein the cam housing includes an outer wall with at least one spiral slot formed therethrough and a reset knob extending therefrom; wherein the cam includes at least one post extending radially outward and configured to slidingly engage within the at least one spiral slot such that as the housing is rotated the cam moves in an axial direction; wherein the cam housing includes an outer wall extending between first and second opposing sidewalls and a spiral ramp formed internally thereto; and wherein the cam includes at least one tab extending axially away from a sidewall, the at least one tab configured to slidingly engage with the spiral ramp such that as the cam housing is rotated the cam moves in an axial direction.

Another aspect of the present disclosure includes a method for opening a combination lock comprising rotating each of a plurality outer dials to an unlocked position; moving a pull knob in an axial direction from a first position to a second position; moving a spindle in the axial direction in response to the moving of the pull knob; pivoting a multiplier link in response to the moving of the spindle; moving a bolt from a locked position to an unlocked position in response to the pivoting of the multiplier link, wherein a distance traveled by bolt is greater than a distance traveled by the spindle.

Another aspect of the present disclosure includes a method for resetting a combination lock comprising rotating a cam housing from a base position to a reset position about an axis of rotation; moving a cam member in an axial direction in response to the rotating of the cam housing; engaging and sliding a reset plate with the cam; moving one or more inner dials with the reset plate to a reset position; rotating one or more outer dials to a desired number when the reset plate is in the reset position; rotating the cam housing back to the base position to set a new outer dial combination.

Refining aspect wherein the cam includes one or more posts extending radially outward into a spherical shaped slot formed in the cam housing; and wherein the cam includes one or more tabs extending axially away from a sidewall configured to engage a spiral ramp formed internal to the cam housing.

Another aspect of the present disclosure includes a method for providing tactile feel feedback comprising rotating an outer dial with a detent ring having a plurality of detent regions formed in an outer surface thereof; and generating a variable resistance to the rotation of the outer dial as the outer dial rotates through the plurality of detent regions.

Refining aspect wherein the variable resistance is generated by engaging an arcuate region of a leaf spring with the detent ring; and wherein the variable resistance is generated by engaging a bump element extending from a dial spacer with the detent ring.

It should be understood that the component and assembly configurations of the present disclosure can be varied according to specific design requirements and need not conform to the general shape, size, connecting means or general configuration shown in the illustrative drawings to fall within the scope and teachings of this patent application.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A combination lock, comprising:
- a housing;
- a dial rotatably supported by the housing and configured to facilitate entry of a code to the combination lock, the dial comprising a plurality of arcuate detents; and
- a spring comprising a first end portion anchored to the housing, and an arcuate engagement portion configured to engage the plurality of arcuate detents of the dial to thereby provide tactile feedback during rotation of the dial.

2. The combination lock of claim 1, wherein the spring further comprises a second end portion, and wherein the arcuate engagement portion is positioned between the first end portion and the second end portion.

3. The combination lock of claim 1, further comprising:
- at least one additional dial; and
- at least one additional spring engaged with the at least one additional dial;
- wherein each additional spring is configured to engage arcuate detents of the at least one additional dial to thereby provide tactile feedback during rotation of the at least one additional dial.

4. The combination lock of claim 1, wherein the dial is an outer dial that is selectively engaged with an inner dial.

5. The combination lock of claim 1, wherein the dial comprises a detent ring including the plurality of arcuate detents.

6. A combination lock, comprising:
- a housing;
- a dial rotatably supported by the housing and configured to facilitate entry of a code to the combination lock, the dial comprising a plurality of detents; and
- a spring comprising a first end portion anchored to the housing, and an engagement portion configured to engage the plurality of detents to thereby provide tactile feedback during rotation of the dial;
- wherein the spring further comprises a second end portion anchored to the housing, and wherein the engagement portion is positioned between the first end portion and the second end portion.

7. A combination lock, comprising:
- a housing;
- a dial rotatably supported by the housing and configured to facilitate entry of a code to the combination lock, the dial comprising a plurality of detents; and
- a spring comprising a first end portion anchored to the housing, and an engagement portion configured to engage the plurality of detents to thereby provide tactile feedback during rotation of the dial;
- wherein the dial comprises a detent ring including the plurality of detents, and wherein the detent ring is positioned on a side surface of the dial.

8. A combination lock, comprising:
- a housing;
- a dial rotatably supported by the housing and configured to facilitate entry of a code to the combination lock, the dial comprising a plurality of detents;
- a spring comprising a first end portion anchored to the housing, and an engagement portion configured to engage the plurality of detents to thereby provide tactile feedback during rotation of the dial; and
- a dial spacer positioned adjacent the dial, wherein the dial spacer includes a spring holding slot that holds the first end portion in a fixed location relative to the housing.

9. A lock apparatus, comprising:
- a housing;
- a locking component operable to be inserted into the housing;
- a spindle selectively operable to move between a first locking position and a first unlocking position offset from the first locking position by a first offset distance;
- a multiplier link pivotably connected to the housing and engaged with the spindle; and
- a bolt engaged with the multiplier link such that the bolt travels between a second locking position and a second unlocking position in response to movement of the spindle between the first locking position and the first unlocking position;
- wherein the bolt is operable to engage the locking component when in the second locking position; and
- wherein the second locking position and the second unlocking position are offset from one another by a second offset distance greater than the first offset distance.

10. The lock apparatus of claim 9, further comprising a code entry device operable to selectively retain the spindle in the first locking position, thereby retaining the bolt in the second locking position.

11. The lock apparatus of claim 10, wherein the code entry device comprises a plurality of dials.

12. The lock apparatus of claim 9, further comprising a flexible member comprising the locking component;
- wherein the flexible member further comprises a fixed component that is fixed to the housing.

13. The lock apparatus of claim 9, wherein the bolt comprises a slot that receives a portion of the multiplier link.

14. The lock apparatus of claim 9, further comprising a pull knob connected with the spindle and configured to facilitate manual movement of the spindle between the first locking position and the first unlocking position.

15. A combination lock, comprising:
- a housing;
- a plurality of outer dials rotatably supported by the housing;
- a plurality of inner dials, each of the inner dials selectively coupled to a corresponding outer dial;
- a longitudinally-extending spindle mounted in the housing for longitudinal movement between a locking position and an unlocking position; and
- a lock reset mechanism, comprising:
  - a reset plate slidably keyed with the spindle and configured to hold the inner dials between a head and an end guide;
  - a rotatable reset housing positioned proximate one end of the spindle; and
  - a reset cam positioned within the reset housing, the reset cam configured to longitudinally move the reset plate and the inner dials to a reset position when the reset housing is rotated from a first position to a second position.

16. The combination lock of claim 15, further comprising at least one tactile feedback mechanism configured to provide a variable resistance to rotation of the outer dials.

17. The combination lock of claim 15, further comprising:

a bolt operable to engage a locking link; and a multiplier link engaged between the bolt and the spindle, wherein the multiplier link is configured to translate movement of the spindle by a first travel distance to movement of the bolt by a second travel distance greater than the first travel distance.

18. The combination lock of claim 15, further comprising:

a spring including a first end portion; and a dial spacer anchoring the first end portion to the housing.

19. The combination lock of claim 18, wherein the spring further includes an engagement portion operable to engage a detent ring coupled to one of the outer dials to thereby provide a variable resistance to rotation of the one of the outer dials.

20. The combination lock of claim 19, wherein the engagement portion is arcuate.

* * * * *